(12) United States Patent
Fiorucci et al.

(10) Patent No.: US 8,387,429 B2
(45) Date of Patent: Mar. 5, 2013

(54) REGENERATIVE LAYING PIPE

(75) Inventors: Keith Fiorucci, Sturbridge, MA (US); Christopher Lashua, Gardner, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 13/535,901

(22) Filed: Jun. 28, 2012

(65) Prior Publication Data

US 2012/0260710 A1 Oct. 18, 2012

Related U.S. Application Data

(62) Division of application No. 12/876,706, filed on Sep. 7, 2010.

(51) Int. Cl.
*B21D 11/00* (2006.01)
*B21D 37/16* (2006.01)
*B21C 47/10* (2006.01)

(52) U.S. Cl. .............. 72/66; 72/135; 72/342.2
(58) Field of Classification Search ............ 72/66, 67, 72/135, 371; 242/361, 361.2–361.4
See application file for complete search history.

(56) References Cited

U.S. PATENT DOCUMENTS 5,839,684 A * 11/1998 Poloni et al. ............ 242/361

* cited by examiner

*Primary Examiner* — Debra Sullivan

(57) ABSTRACT

A laying pipe configured for rotation about its axis in a rolling mill laying head, comprises a metal outer tube having an entry section aligned with its axis, an intermediate section curving away from its axis, and a delivery section having a constant radius measured from its axis. A metal inner tube has entry, intermediate and delivery sections respectively lining the entry, intermediate and delivery sections of the outer tube. The inner tube is constrained against movement relative to the outer tube solely by frictional contact with the outer tube. The inner tube is movable incrementally within the outer tube in one direction in response to heating and cooling cycles during rotation of the laying pipe about its axis.

5 Claims, 3 Drawing Sheets

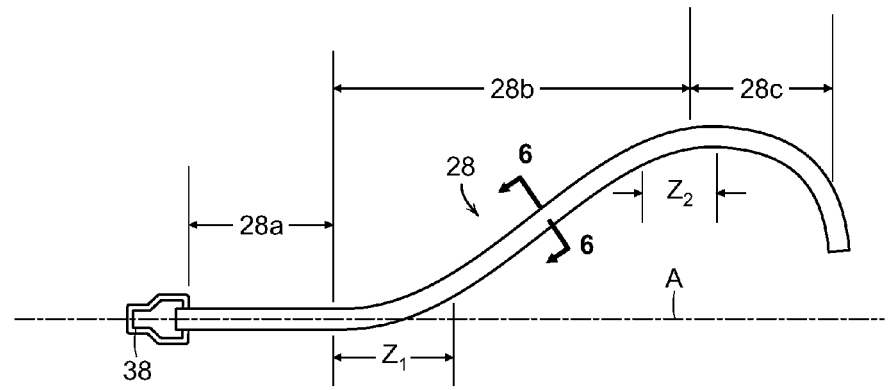
FIG. 3
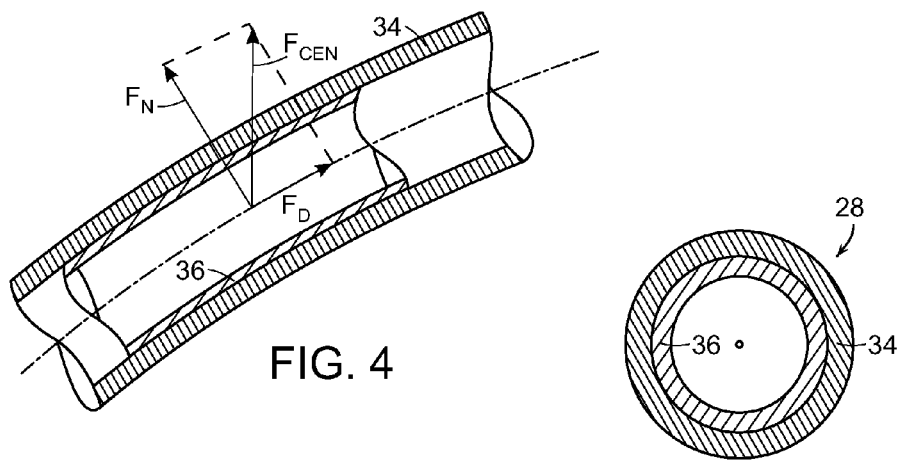
FIG. 4
FIG. 6
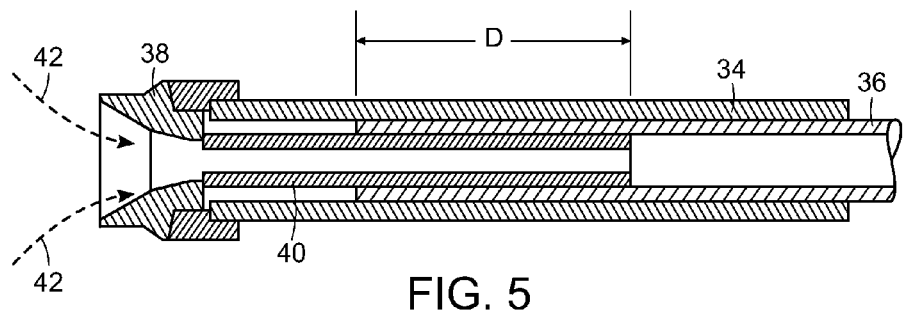
FIG. 5

REGENERATIVE LAYING PIPE

CROSS-REFERENCE TO RELATED APPLICATIONS

This application is a divisional of U.S. patent application Ser. No. 12/876,706, filed 7 Sep. 2010, and a continuation of International Patent Application Serial No. PCT/US2011/050283, filed 2 Sep. 2011, the entire contents and substance of which are hereby incorporated by reference as if fully set forth below.

BACKGROUND

1. Field

Aspects of the present invention relate generally to the laying pipes employed in rolling mill laying heads to form hot rolled products into helical ring formations, and more particularly with prolonging the useful life of such pipes by periodically shifting and thus renewing internal pipe surfaces that are prone to undergoing localized accelerated wear occasioned by frictional contact with the hot rolled products.

2. Description of Related Art

In a typical rod rolling mill, as depicted diagrammatically in FIG. 1, billets are reheated in a furnace 10. The heated billets are extracted from the furnace and rolled through a roughing mill 12, an intermediate mill 14, a finishing mill 16, and, in some cases, a reducing/sizing mill (not shown). The finished products are then directed to a laying head 18 where they are formed into rings 20. The rings are deposited on a conveyor 22 for transport to a reforming station 24 where they are gathered into coils. While in transit on the conveyor, the rings are subjected to controlled cooling to achieve selected metallurgical properties.

Again, as depicted diagrammatically in FIG. 2, the laying head 18 includes a hollow quill 26 containing a curved laying pipe 28. A bevel gear set 30 powered by a motor 32 serves to rotatably drive the quill and laying pipe about an axis "A".

Over the last several decades, the delivery speeds of rod rolling mills have increase dramatically. For example, mills now have the capability of rolling 5.5 mm rod at speeds of 110 m/sec. and higher. At such speeds, the hot rolled products exert a punishing effect on the laying pipes, causing internal pipe surfaces to undergo rapid localized frictional wear and premature failure. Also, as the laying pipes wear, their ability to deliver a stable ring pattern to the conveyor 22 deteriorates. Unstable ring patterns disturb cooling uniformity and also contribute to coiling mishaps, commonly referred to as "cobbling", at the reforming station 24. Frequent and costly mill shutdowns are required to replace prematurely worn laying pipes and to address problems associated with cobbling at the reforming station.

Those skilled in the art have made repeated attempts at increasing the useful life of laying pipes. For example, as disclosed in U.S. Pat. Nos. 4,074,553 and 5,839,684, it has been proposed to line the laying pipes with wear resistant inserts. U.S. Pat. No. 6,098,909 discloses a different approach where the laying pipe is eliminated in favor of a guide path defined by a spiral groove in the outer surface of a conical insert enclosed by a conical outer casing, with the insert being rotatable within the outer casing to gradually shift the wear pattern on the inner surface of the outer casing.

For various reasons, none of these approaches has proven to be a practical solution to the problem of premature pipe wear.

Attempts have also been made at carburizing the interior pipe surfaces in order to increase hardness and resistance to wear. However, the carburizing process requires a drastic quenching from elevated processing temperatures, which can distort the pipe curvature. The carburized layer has also been found to be relatively brittle and to temper down at elevated temperatures resulting from exposure to the hot rolled products.

For a number of years, it has been well accepted that laying pipes with reduced bore sizes provide a number of significant advantages. By radially constricting the hot rolled products within a smaller space, guidance is improved and the ring pattern delivered to the cooling conveyor is more consistent, making it possible to roll at higher speeds. Unfortunately, however, these advantages have been offset to a large extent by significantly accelerated pipe wear. Thus, in the past, those skilled in the art have deemed it necessary to compromise by employing larger bore laying pipes and rolling at reduced speeds below the rated design speeds of the mills.

SUMMARY

Broadly stated, the objective of the present invention is to provide an improved laying pipe having a unique regenerative capability which allows it to remain in service for prolonged periods without succumbing to localized frictional wear occasioned by frictional contact with the hot rolled products.

A laying pipe in accordance with the present invention is configured for rotation about an axis in a rolling mill laying head. The laying pipe comprises a metal outer tube having an entry section aligned with the pipe axis, an intermediate section curving away from the pipe axis, and a delivery section having a constant radius measured from the pipe axis. A metal inner tube has entry, intermediate and delivery sections respectively lining the entry, intermediate and delivery sections of the outer tube. The inner tube is constrained against movement relative to the outer tube solely by frictional contact with the outer tube. The inner tube is movable incrementally within the outer tube in response to heating and cooling cycles during rotation of the laying pipe about its axis. This incremental movement serves to periodically shift and thus renew the internal pipe surfaces in frictional contact with the hot rolled product, and in so doing, avoids prolonged wear at any one location.

These and other features and attendant advantages of the present invention will now be described in further detail with reference to the accompanying drawings, wherein:

BRIEF DESCRIPTION OF THE DRAWINGS

FIG. 3 is a side elevational view of a laying pipe in accordance with the present invention;

FIG. 4 is a partial longitudinal sectional view of the laying pipe;

FIG. 5 is a longitudinal sectional view of the entry end of the laying pipe;

FIG. 6 is a cross sectional view taken along line 6-6 of FIG. 3; and

DETAILED DESCRIPTION

Figure 1:
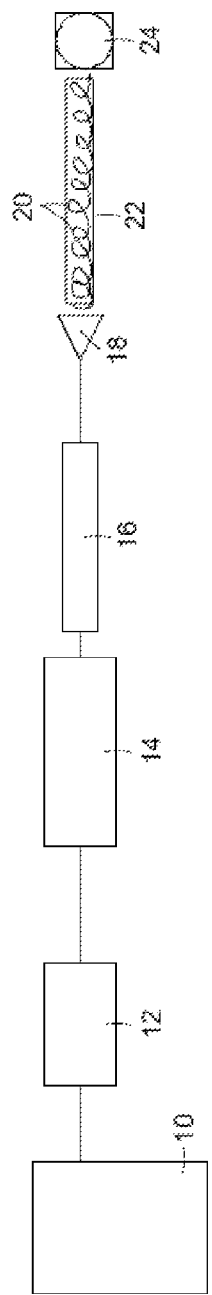
FIG. 1 is a diagrammatic illustration of a typical rolling mill layout.
Figure 2:
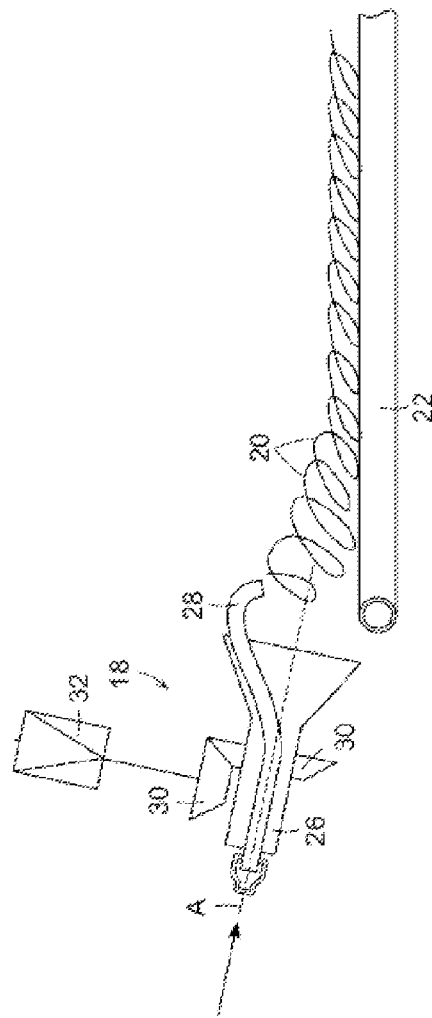
FIG. 2 is an enlarged diagrammatic illustration of the laying head and associated mill components.

With reference to FIGS. 3 and 6, the laying pipe 28 in accordance with the present invention is configured for rotation about axis A. The laying pipe comprises a metal outer tube 34 having an entry section 28a aligned with axis A, an intermediate section 28b curving away from axis A, and a delivery section 28c having a constant radius measured from axis A.

A metal inner tube 36 has entry, intermediate and delivery sections respectively lining the entry, intermediate and delivery sections of the outer tube 34. The inner tube 36 is constrained against movement relative to the outer tube 34 solely by frictional contact with the outer tube.

The tubes 34, 36 may be fabricated from various metals, preferred examples being ferrous metals, nickel based alloys, cobalt based alloys and titanium based alloys.

It has been observed that in service, the internal surface of a laying pipe is prone to accelerated localized wear in zone Z, approximately at the junction of entry section 28a and intermediate section 28b, and again in zone $Z_2$ approximately at the junction between intermediate section 28b and the delivery section 28c. If left unchecked, this localized wear results in premature grooving of the interior pipe surface, followed by a breakthrough of the product through the wall of the laying pipe.

In accordance with the present invention, this wear problem is addressed by lining the outer tube 34 with the inner tube 36, and by allowing the inner tube to be restrained against movement within the outer tube solely by frictional contact between their respective outer and inner surfaces.

When the laying pipe is in service, the inner tube 36 is heated by contact with the hot rolled product. Typically, the hot rolled product will be at a temperature of about 900-1100° C. which will result in a heating of the inner tube 36 to an elevated temperature of about 400° C. The outer tube will typically have a lower temperature due to its exposure to the surrounding atmosphere.

Additionally, as shown in FIG. 4, the intermediate section 28b of the laying pipe will be subjected to a centrifugal force $F_{CEN}$ as a result of its rotation about axis A. This force can be resolved into a force $F_N$ normal to the guide path of the laying pipe, and drive force $F_D$ exerted towards the delivery end of the laying pipe. Driving force $F_D$ will be supplemented by an additional driving force exerted by the hot rolled product passing through the laying pipe.

Figure 7A:
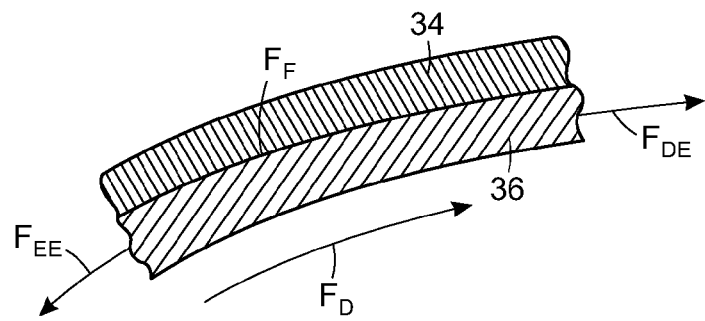
FIGS. 7A-7C are diagrammatic depictions illustrating the forces acting on the inner tube during heating and cooling cycles.

As shown in FIG. 7A, as the inner tube is being heated by contact with the hot rolled product, it will undergo expansion, exerting forces in opposite directions towards the entry end (arrow $F_{EE}$) and the delivery end (arrow $F_{DE}$). The expansion forces $F_{EE}$ and $F_{DE}$ are sufficient to overcome the frictional resistance $F_F$. The expansion force $F_{EE}$ is overcome by the sum of expansion force $F_{DE}$ and the driving force $F_D$, resulting in the inner tube 36 being shifted incrementally within the outer tube 34 towards the delivery end of the outer tube.

Figure 7B:
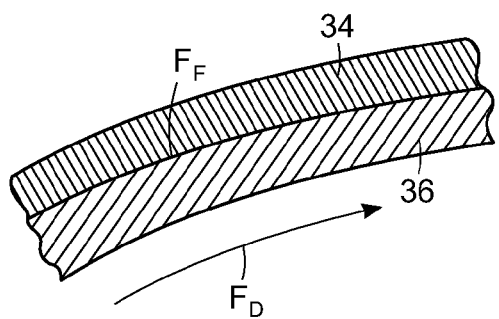

As shown in FIG. 7B, when the temperature of the inner tube 36 stabilizes, there are no expansion or contraction forces. The frictional force $F_F$ overcomes the driving force $F_D$, and the inner tube remains fixed within the outer tube.

Figure 7C:
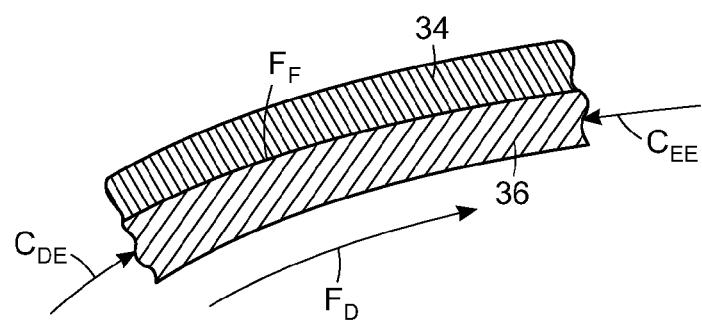

As shown in FIG. 7C, when the inner tube is cooled, it will undergo contraction, again exerting opposite forces towards the entry end (arrow $C_{EE}$) and the delivery end (arrow $C_{DE}$). The forces $C_{EE}$ and $C_{DE}$ are sufficient to overcome the frictional force $F_F$. The contraction force $C_{EE}$ is overcome by the sum of contraction force $C_{DE}$ and the driving force $F_D$, resulting in the entry end of the inner tube 36 being shifted incrementally within the outer tube towards the delivery end of the outer tube.

Thus, it will be seen that as the laying pipe undergoes heating and cooling cycles, the inner tube 36 will be shifted incrementally in one direction towards the delivery end of the outer tube. This incremental shifting will change and thus renew the internal surfaces of the inner tube that are in frictional contact with the hot rolled product, and in so doing, will avoid prolonged frictional contact at any one given area.

In order to compensate for the incremental advancement of the inner tube, and as shown in FIG. 5, the entry end of the laying pipe is provided with an entry guide 38 fixed to the entry section 28a of the outer tube 34. The entry guide includes a guide tube 40 projecting telescopically into the entry section of the inner tube 36. The overlap distance "D" is sufficient to accommodate the incremental advancement of the entry end of the inner tube without creating a gap that might hinder the smooth guidance of products into the inner pipe.

The inner tube 36 may undergo heating and cooling cycles as a result of normal gaps in the rolling program, e.g., between billets, during down times for mill maintenance, etc. Preferably, however, the heating and cooling cycles will be controlled, for example by introducing water vapor into the entry guide, as indicated by the broken arrows at 42 in FIG. 5.

While aspects of the invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A laying pipe configured for rotation about an axis in a rolling mill laying head, said laying pipe comprising:
   a metal outer tube having an entry section aligned with said axis, an intermediate section curving away from said axis, and a delivery section having a constant radius measured from said axis;
   a metal inner tube having entry, intermediate and delivery sections respectively lining the entry, intermediate and delivery sections of said outer tube, said inner tube being constrained against movement relative to said outer tube solely by frictional contact with said outer tube, said inner tube being movable incrementally within said outer tube in one direction in response to heating and cooling cycles during rotation of said laying pipe about said axis.

2. The laying pipe of claim 1 wherein the metals of said inner and outer tubes are selected from the group consisting of ferrous metals, nickel based alloys, cobalt based alloys and titanium based alloys.

3. The laying pipe of claim 1 further comprising an entry guide fixed to the entry section of said outer tube, said entry guide having an entry tube projecting into the entry section of said inner tube.

4. The laying pipe of claim 3 wherein said entry guide is configured and arranged to accommodate the introduction of a fluid coolant.

5. A laying pipe configured for rotation about an axis in a rolling mill laying head, said laying pipe comprising:
   a metal outer tube having an entry section aligned with said axis, an intermediate section curving away from said axis, and a delivery section having a constant radius measured from said axis;
   a metal inner tube having entry, intermediate and delivery sections respectively lining the entry, intermediate and delivery sections of said outer tube, said inner tube being constrained against movement relative to said outer tube solely by frictional contact with said outer tube, said inner tube being movable incrementally within said outer tube in one direction in response to heating and cooling cycles during rotation of said laying pipe about said axis; and an entry guide fixed to the entry section of said outer tube, wherein said entry tube projects into the entry section of said inner tube by an overlap distance sufficient to accommodate incremental advancement of the entry end of said inner tube without a gap being created between said entry tube and said inner tube.

* * * * *